United States Patent
Li et al.

(10) Patent No.: US 11,930,157 B2
(45) Date of Patent: Mar. 12, 2024

(54) EYE TRACKING METHOD AND EYE TRACKING DEVICE

(71) Applicant: Acer Incorporated, New Taipei (TW)

(72) Inventors: Yen-Hsien Li, New Taipei (TW); Shih-Ting Huang, New Taipei (TW); Chao-Shih Huang, New Taipei (TW)

(73) Assignee: Acer Incorporated, New Taipei (TW)

(*) Notice: Subject to any disclaimer, the term of this patent is extended or adjusted under 35 U.S.C. 154(b) by 151 days.

(21) Appl. No.: 17/706,622

(22) Filed: Mar. 29, 2022

(65) Prior Publication Data
US 2023/0130892 A1 Apr. 27, 2023

(30) Foreign Application Priority Data
Oct. 22, 2021 (TW) ................. 110139368

(51) Int. Cl.
*H04N 13/383* (2018.01)
*G06T 7/70* (2017.01)
*H04N 13/302* (2018.01)

(52) U.S. Cl.
CPC ............ *H04N 13/383* (2018.05); *G06T 7/70* (2017.01); *H04N 13/302* (2018.05); *G06T 2207/30201* (2013.01)

(58) Field of Classification Search
CPC .................................................. H04N 13/383
USPC .......................................................... 348/54
See application file for complete search history.

(56) References Cited

U.S. PATENT DOCUMENTS

2020/0183182 A1* 6/2020 Yang ............... H04N 13/376

FOREIGN PATENT DOCUMENTS

| CN | 106331688 | 1/2017 |
| CN | 104272733 | 3/2017 |
| TW | 202026699 | 7/2020 |
| TW | 202123693 | 6/2021 |

* cited by examiner

*Primary Examiner* — Amir Shahnami
(74) *Attorney, Agent, or Firm* — JCIPRNET

(57) ABSTRACT

The disclosure provides an eye tracking method and an eye tracking device. The method includes obtaining a reference interpupillary distance value; taking images of a user of a 3D display, and finding a first eye pixel coordinate corresponding to a first eye of the user and a second eye pixel coordinate corresponding to a second eye of the user in each image; detecting a first and a second eye spatial coordinates of the first and the second eyes, and determining projection coordinates based on the first eye spatial coordinate, the second eye spatial coordinate, and optical parameters of image capturing elements; determining an optimization condition related to the first and second eye spatial coordinates based on the first and second eye pixel coordinates, the projection coordinates, and the reference interpupillary distance value of each image; and optimizing the first and second eye spatial coordinates based on the optimization condition.

20 Claims, 3 Drawing Sheets

EYE TRACKING METHOD AND EYE TRACKING DEVICE

CROSS-REFERENCE TO RELATED APPLICATION

This application claims the priority benefit of Taiwan application serial no. 110139368, filed on Oct. 22, 2021. The entirety of the above-mentioned patent application is hereby incorporated by reference herein and made a part of this specification.

BACKGROUND

Technology Field

The disclosure relates to an eye tracking method and an eye tracking device, and particularly, to an eye tracking method and an eye tracking device that may be used with a naked eye 3D display.

Description of Related Art

Currently, naked eye 3D displays may first place the pixels of the left eye and the right eye at the corresponding pixel positions of a display panel, respectively, and then the images of the left and right eyes are projected to the accurate eyes respectively through a liquid crystal light path in a 3D lens. It requires to focus on the left and right eyes, so the 3D lens usually comes with an arc design, and accordingly the image of the left (right) eye can be focused and projected into the left (right) eye. However, limited by the refracted light path, some rays may be projected into a wrong eye. That is, the image of the left (right) eye goes to the right (left) eye erroneously, and this phenomenon is called 3D crosstalk.

Generally speaking, naked eye 3D displays are usually equipped with an eye tracking system to provide corresponding images to the eyes of a user after obtaining the positions of the eyes of the user. At present, most common eye tracking methods use dual-pupil cameras for face recognition, and the positions of the two eyes are obtained by triangulation. However, this measurement method is often limited by hardware capabilities, and the measurement accuracy cannot be ensured in remote locations. In this case, the 3D crosstalk situation may become more serious when there is a long distance between the user and the 3D display.

SUMMARY

In view of this, the disclosure provides an eye tracking method and an eye tracking device for solving the technical problems.

The disclosure provides an eye tracking method adapted for an eye tracking device including multiple image capturing elements. The eye tracking method includes steps as follows. A reference interpupillary distance value is obtained. Multiple images of a user of a 3D display are taken through the image capturing elements. A first eye pixel coordinate corresponding to a first eye of the user and a second eye pixel coordinate corresponding to a second eye of the user are found in each of the images. A first eye spatial coordinate of the first eye of the user and a second eye spatial coordinate of the second eye of the user are detected. Multiple projection coordinates are determined based on the first eye spatial coordinate, the second eye spatial coordinate, and multiple optical parameters of the image capturing elements. An optimization condition related to the first eye spatial coordinate and the second eye spatial coordinate is determined based on the first eye pixel coordinate, the second eye pixel coordinate, the projection coordinates, and the reference interpupillary distance value of each of the images. The first eye spatial coordinate and the second eye spatial coordinate are optimized based on the optimization condition.

The disclosure provides an eye tracking device including multiple image capturing elements and a processor. The processor is coupled to the image capturing elements and configured to: obtain a reference interpupillary distance value; take multiple images of a user of a 3D display through the image capturing elements and find a first eye pixel coordinate corresponding to a first eye of the user and a second eye pixel coordinate corresponding to a second eye of the user in each of the images; detect a first eye spatial coordinate of the first eye of the user and a second eye spatial coordinate of the second eye of the user and determine multiple projection coordinates based on the first eye spatial coordinate, the second eye spatial coordinate, and multiple optical parameters of the image capturing elements; determine an optimization condition related to the first eye spatial coordinate and the second eye spatial coordinate based on the first eye pixel coordinate, the second eye pixel coordinate, the projection coordinates, and the reference interpupillary distance value of each of the images; and optimize the first eye spatial coordinate and the second eye spatial coordinate based on the optimization condition.

DESCRIPTION OF THE EMBODIMENTS

Figure 1A:
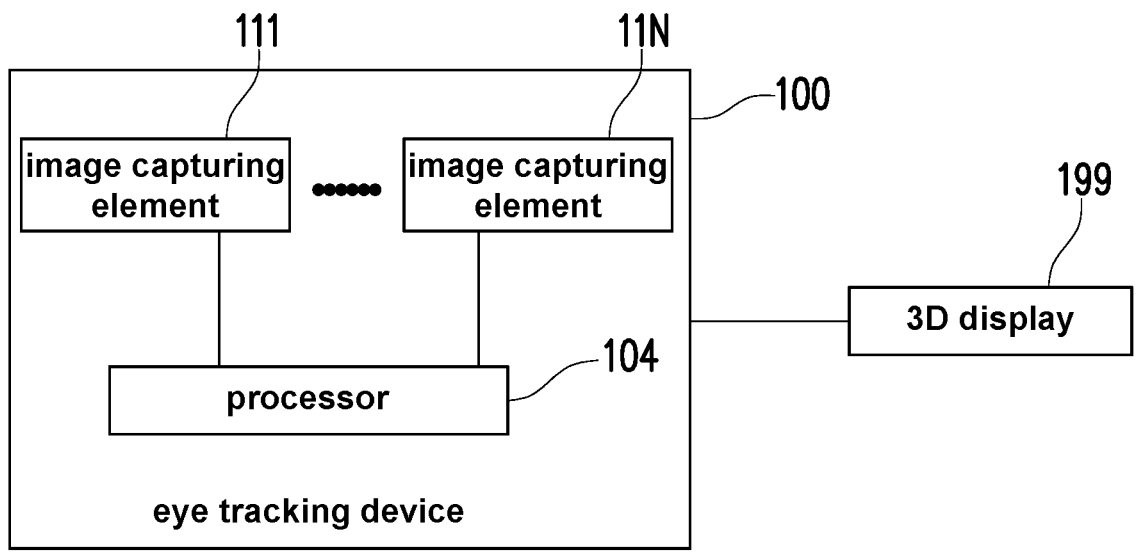
FIG. 1A and FIG. 1B are schematic views of an eye tracking device and a 3D display according to an embodiment of the disclosure.
Figure 1B:
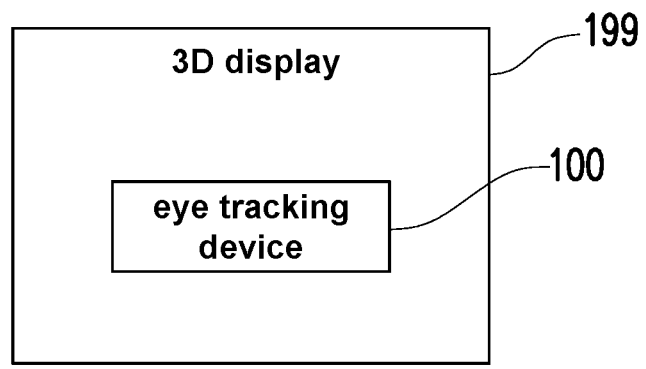

Referring to FIG. 1A and FIG. 1B, both are schematic views of an eye tracking device and a 3D display according to an embodiment of the disclosure. In FIG. 1A, an eye tracking device 100 includes N (N is a positive integer) image capturing elements 111 to 11N and a processor 104. In the embodiment of the disclosure, the eye tracking device 100 may be externally connected to a 3D display 199 (e.g., a naked eye 3D display) to provide the 3D display 199 with relevant eye tracking information. Moreover, as shown in FIG. 1B, the eye tracking device 100 may also be integrated into the 3D display 199 to provide relevant eye tracking information.

After obtaining the eye tracking information provided by the eye tracking device 100, the 3D display 199 may adjust the display content accordingly, and users who watch the 3D display 199 can watch the display content of the 3D display while experiencing low 3D crosstalk. The relevant details are illustrated in the subsequent paragraphs.

In different embodiments, for example, the image capturing elements 111-11N are any image capturing device with lens having a charge coupled device (CCD), or lens having complementary metal oxide semiconductor transistors (CMOS) lens, but the disclosure is not limited thereto.

The processor 104 is coupled to the image capturing elements 111-11N. The processor 104 can be general-purpose processors, special-purpose processors, traditional processors, digital signal processors, multiple microprocessors, one or more microprocessors combined with the core of the digital signal processor, controllers, microcontrollers, and application specific integrated circuits (ASICs), field programmable gate arrays (FPGAs), any other types of integrated circuits, state machines, processors based on advanced RISC machine (ARM), and the like.

In the embodiment of the disclosure, the processor 104 accesses relevant modules and program codes to implement the eye tracking method proposed in the disclosure. The details are illustrated in detail as follows.

Figure 2:
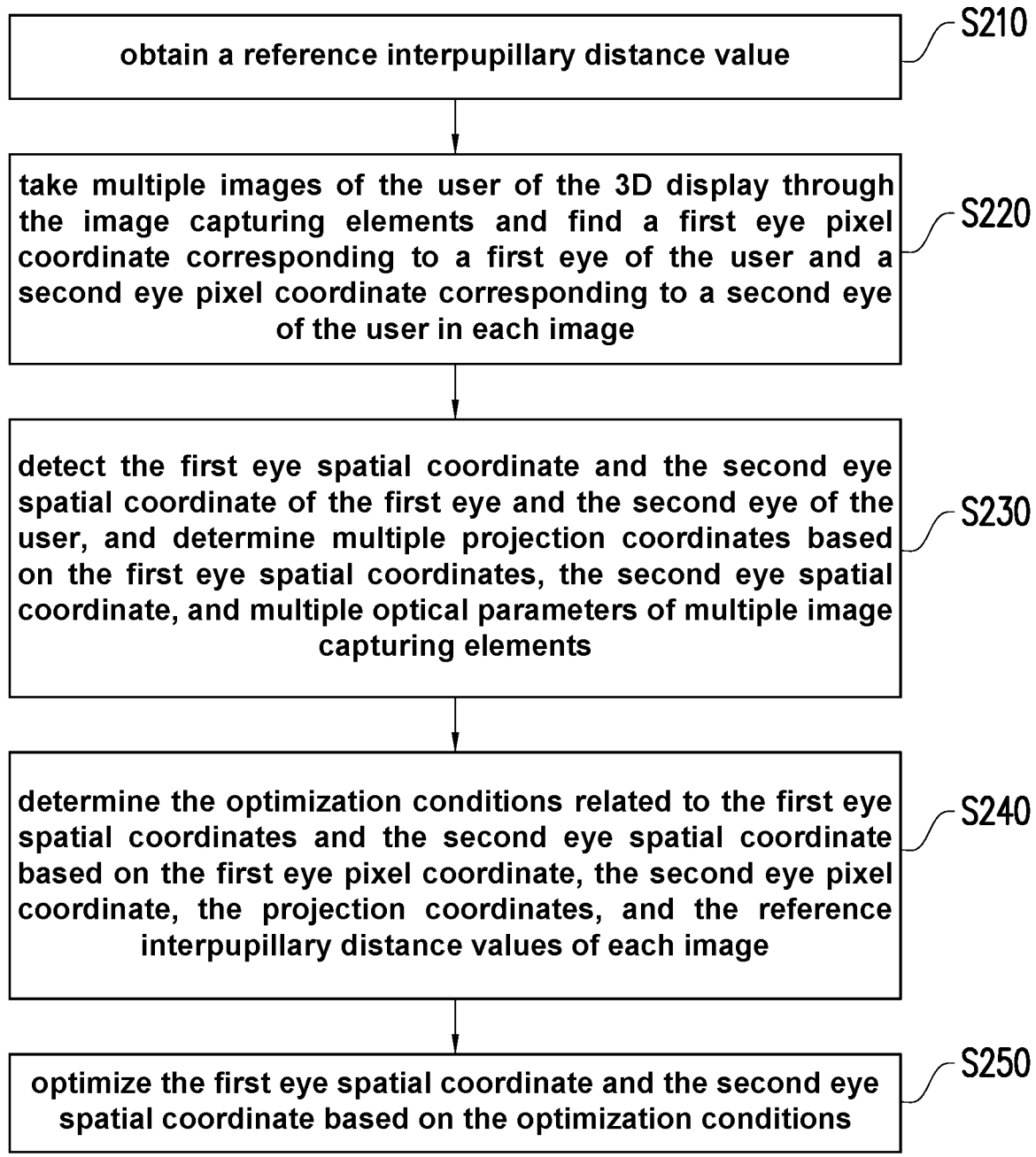
FIG. 2 is a flowchart of an eye tracking method according to an embodiment of the disclosure.

Referring to FIG. 2, FIG. 2 is a flowchart of an eye tracking method according to an embodiment of the disclosure. The method of the embodiment may be implemented by the eye tracking device 100 of FIG. 1. Details of each step in FIG. 2 are illustrated with reference to the elements shown in FIG. 1 in the subsequent paragraphs.

First, in step S210, the processor 104 obtains a reference interpupillary distance value (represented by D1). In the first embodiment, the processor 104 may directly use an average human interpupillary distance value (e.g., 63.5 mm) as the reference interpupillary distance value.

In the second embodiment, for example, the processor 104 may request the user to move to a designated position, and the current interpupillary distance value of the user is measured and serves as the reference interpupillary distance value. The distance between the designated position and each of the image capturing elements 111-11N is less than a preset distance threshold value. In different embodiments, the preset distance threshold value may be set to a distance value that allows the processor 104 to measure an accurate enough interpupillary distance. In short, the processor 104 may request the user to move to a position closer to each of the image capturing elements 111-11N, so that a more accurate measurement of the interpupillary distance of the user may be performed. Moreover, in other embodiments, the concept can also be understood as requesting the user to move to a position close enough to the 3D display 199 for the processor 104 to measure an accurate enough interpupillary distance value, but the disclosure is not limited thereto.

In different embodiments, for example, the processor 104 may control the 3D display 199 to guide the user to move to the designated location through sounds or images, but the disclosure is not limited thereto.

Moreover, in the third embodiment, the processor 104 may also directly measure the current interpupillary distance value of the user and correct the current interpupillary distance value based on multiple historical interpupillary distance values, and then the corrected current interpupillary distance value is used as the reference interpupillary distance value. In an embodiment, the processor 104 may input the historical interpupillary distance value and the current interpupillary distance value into a Kalman filter, and the Kalman filter may correct the current interpupillary distance value, but the disclosure may not be limited thereto.

In the third embodiment, the processor 104 may provide the Kalman filter with a preset initial interpupillary distance value. In some embodiments, the initial interpupillary distance value can be set to any value. In some embodiments, the initial interpupillary distance value may be set to the average human interpupillary distance value (e.g., 63.5 mm), but the disclosure may not be limited thereto. Moreover, in obtaining the reference interpupillary distance value through the Kalman filter, excessively deviated values may be filtered out accordingly.

Next, in step S220, the processor 104 takes multiple images of the user of the 3D display 199 through the image capturing elements 111-11N and finds a first eye pixel coordinate corresponding to a first eye of the user and a second eye pixel coordinate corresponding to a second eye of the user in each image.

Figure 3:
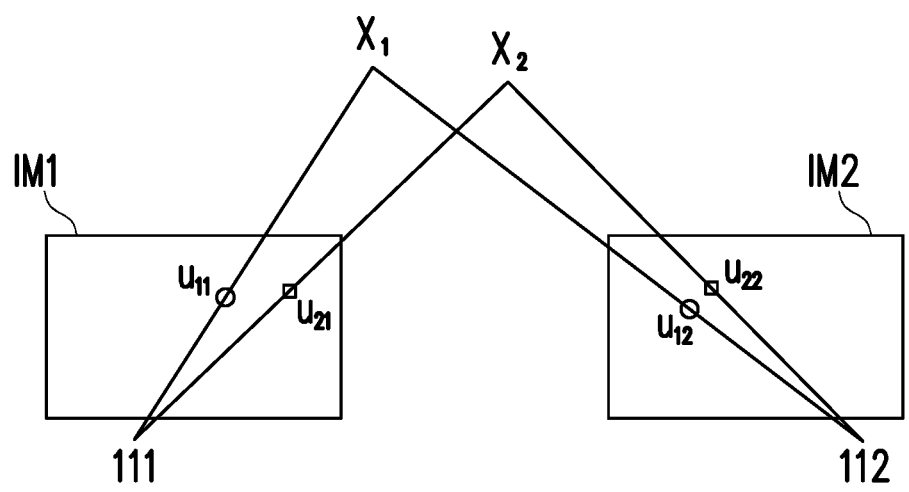
FIG. 3 illustrates an application scenario according to an embodiment of the disclosure.

To make the concept of the disclosure easier to understand, with reference to FIG. 3, further illustration is provided in the subsequent paragraphs. Referring to FIG. 3, FIG. 3 illustrates an application scenario according to an embodiment of the disclosure. In the embodiment, it is assumed that the eye tracking device 100 includes a total of two (i.e., N is 2) image capturing elements 111 and 112 whose respective positions are shown in FIG. 3.

In an embodiment, the processor 104 may control the image capturing elements 111 and 112 to take images IM1 and IM2 of the user of the 3D display 199, respectively. In FIG. 3, it is assumed that the coordinates of the first eye and the second eye of the user in the three-dimensional space are represented by a first eye spatial coordinate $X_1$ and a second eye spatial coordinate $X_2$, respectively. In this case, the processor 104 may find the first eye pixel coordinate corresponding to the first eye of the user and the second eye pixel coordinate corresponding to the second eye of the user in the images IM1 and IM2, respectively.

For example, in the image IM1, the processor 104 may find a first eye pixel coordinate $u_{11}$ corresponding to the first eye of the user and a second eye pixel coordinates $u_{21}$ corresponding to the second eye of the user, respectively. Moreover, in the image IM2, the processor 104 may find a first eye pixel coordinate $u_{12}$ corresponding to the first eye of the user and a second eye pixel coordinates $u_{22}$ corresponding to the second eye of the user, respectively.

In the scenario of FIG. 3, the image capturing elements 111 and 112 may be interpreted as a dual-pupil camera, and when the dual-pupil camera is used for eye tracking, generally speaking, the images IM1 and IM2 each may be analyzed to obtain corresponding information of the two eyes and the face, and a feature matching and a bundle adjustment method are performed only on information of the two eyes and the face. In this way, the first eye pixel coordinate $u_{11}$ and the second eye pixel coordinates $u_{21}$ in the image IM1 and the first eye pixel coordinate $u_{12}$ and the second eye pixel coordinate $u_{22}$ in the image IM2 can be found accordingly, but the disclosure is not limited thereto.

In step S230, the processor 104 detects the first eye spatial coordinate $X_1$ and the second eye spatial coordinate $X_2$ of the first eye and the second eye of the user. Moreover, based on the first eye spatial coordinates $X_1$, the second eye spatial coordinate $X_2$, and multiple optical parameters of multiple image capturing elements, multiple projection coordinates are determined. In the embodiment of the disclosure, the multiple optical parameters (e.g. exposure value, focal length, and the like) of the j-th (j is an integer ranging from 1 to N) image capturing element of the image capturing elements 111-11N can be represented by $C_j$. The projection coordinates generated based on $X_i$ and $C_j$ can be represented by $f(X_i, C_j)$ (i is 1 or 2).

In some embodiments, for details of step S220 and step S230, refer to *Bundle Adjustment Revisited*. Chen, Yu & Chen, Yisong & Wang, Guoping. (2019). The details are not repeated herein.

In step S240, the processor 104 determines the optimization conditions related to the first eye spatial coordinates $X_1$ and the second eye spatial coordinate $X_2$ based on the first eye pixel coordinate, the second eye pixel coordinate, the projection coordinates, and the reference interpupillary distance values of each image.

In the prior art, although there are methods for determining the optimization conditions related to the first eye spatial coordinate $X_1$ and the second eye spatial coordinate $X_2$, the optimization conditions used do not involve any parameters related to the interpupillary distance value.

For example, the optimization condition used in the prior art is, for example, "min $\Sigma_{i=1}^2 \Sigma_{j=1}^2 (u_{ij} - f(X_i, C_j))^2$". According to the formula, not any parameters related to the interpupillary distance of the user are considered when optimizing the first eye spatial coordinate $X_1$ and the second eye spatial coordinate $X_2$. Therefore, the first eye spatial coordinate $X_1$ and the second eye spatial coordinate $X_2$ optimized by the formula may have errors, resulting in the 3D crosstalk.

However, in the embodiment of the disclosure, the optimization condition obtained in step S240 is, for example, "min $\Sigma_{i=1}^2 \Sigma_{j=1}^N (u_{ij} - f(X_i, C_j))^2 + \beta(\text{norm}(X_1 - X_2) - D1)^2$)", where norm($X_1-X_2$) is the distance between $X_1$ and $X_2$ and $\beta$ is the weight. In different embodiments, any value of $\beta$ can be selected according to the needs of the designer.

Subsequently, in step S250, the processor 104 optimizes the first eye spatial coordinate $X_1$ and the second eye spatial coordinate $X_2$ based on the optimization conditions. In different embodiments, the processor 104 may perform step S250 based on the stochastic gradient descent (SGD) method, the momentum gradient descent method, the Adagrad method, the RMSProp method, the adaptive moment estimation method, and the like, but the disclosure may not be limited thereto.

In an embodiment, the processor 104 may also provide the 3D display 199 with the optimized first eye spatial coordinate $X_1$ and second eye spatial coordinate $X_2$, and the 3D display 199 determines at least one first pixel used for projection to the first eye of the user and at least one second pixel used for projection to the second eye of the user among multiple pixels of the 3D display based on the optimized first eye spatial coordinate $X_1$ and second eye spatial coordinate $X_2$.

In one embodiment, after the 3D display 199 obtains the optimized first eye spatial coordinate $X_1$ and the second eye spatial coordinate $X_2$, the lenticular lens may be started, and the pixel positions on the 3D display 199 may be adjusted so that the user can see three-dimensional images. For related details, refer to the literature related to 3D rendering in the prior art, and the details is not repeated herein.

By adding the reference interpupillary distance value to the optimization conditions, the subsequent optimization results of the first eye spatial coordinate $X_1$ and the second eye spatial coordinate $X_2$ may be more accurate, so that the 3D display 199 may provide the user with more display content with low 3D crosstalk.

In summary, the interpupillary distance value in the optimization conditions related to the first eye spatial coordinate and the second eye spatial coordinate is taken into consideration in the embodiments of the disclosure. Accordingly, the more accurate optimized results of the first eye spatial coordinate and the second eye spatial coordinate may be obtained. In this case, even if there is a relatively long distance between the user and the 3D display, the 3D display may still provide the user with display content with lower 3D crosstalk based on the optimized results of the first eye spatial coordinate and the second eye spatial coordinate, and therefore the viewing experience of the user may be further improved.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. An eye tracking method, adapted for an eye tracking device comprising a plurality of image capturing elements, and comprising:

obtaining a reference interpupillary distance value;

taking a plurality of images of a user of a 3D display through the image capturing elements, and finding a first eye pixel coordinate corresponding to a first eye of the user and a second eye pixel coordinate corresponding to a second eye of the user in each of the images;

detecting a first eye spatial coordinate of the first eye of the user and a second eye spatial coordinate of the second eye of the user, and determining a plurality of projection coordinates based on the first eye spatial coordinate, the second eye spatial coordinate, and a plurality of optical parameters of the image capturing elements;

determining an optimization condition related to the first eye spatial coordinate and the second eye spatial coordinate based on the first eye pixel coordinate, the second eye pixel coordinate, the projection coordinates, and the reference interpupillary distance value of each of the images; and optimizing the first eye spatial coordinate and the second eye spatial coordinate based on the optimization condition.

2. The eye tracking method according to claim 1, wherein the step of obtaining the reference interpupillary distance value comprises:

requesting the user to move to a designated position and measuring a current interpupillary distance value of the user to serve as the reference interpupillary distance value.

3. The eye tracking method according to claim 2, wherein a distance between the designated position and the image capturing elements is less than a predetermined distance threshold value.

4. The eye tracking method according to claim 2, further comprising:

guiding the user to move to the designated location through sounds or images.

5. The eye tracking method according to claim 1, wherein the step of obtaining the reference interpupillary distance value comprises:

measuring a current interpupillary distance value of the user and correcting the current interpupillary distance value based on a plurality of historical interpupillary distance values; and using the corrected current interpupillary distance value as the reference interpupillary distance value.

6. The eye tracking method according to claim 5, wherein the step of correcting the current interpupillary distance value based on the historical interpupillary distance values comprises:

inputting the historical interpupillary distance values and the current interpupillary distance values into a Kalman filter, so that the current interpupillary distance value is corrected by the Kalman filter.

7. The eye tracking method according to claim 1, wherein a number of the image capturing elements and the images is N, the first eye pixel coordinate and the second eye pixel coordinate on a j-th image of the images are represented as $u_{1j}$ and $u_{2j}$, respectively, the first eye spatial coordinate and the second eye spatial coordinate are represented by $X_1$ and $X_2$, respectively, the optical parameters of a j-th image capturing element of the image capturing elements are represented by $C_j$, and the optimization condition is represented by:

$$\min\left(\sum_{i=1}^{2}\sum_{j=1}^{N}(u_{ij}-f(X_i,C_j))^2+\beta(norm(X_1-X_2)-D1)^2\right)$$

where $norm(X_1-X_2)$ is a distance between $X_1$ and $X_2$, $\beta$ is a weight, D1 is the reference interpupillary distance value, and $f(X_i,C_j)$ is the projection coordinate generated based on $X_i$ and $C_j$.

8. The eye tracking method according to claim 1, wherein the step of optimizing the first eye spatial coordinate and the second eye spatial coordinate based on the optimization condition comprises:
using a gradient descent method to optimize the first eye spatial coordinate and the second eye spatial coordinate based on the optimization condition.

9. The eye tracking method according to claim 1, wherein after the step of optimizing the first eye spatial coordinate and the second eye spatial coordinate based on the optimization condition, the method further comprises:
providing the 3D display with the optimized first eye spatial coordinate and the optimized second eye spatial coordinate, wherein the 3D display determines at least one first pixel used for projection to the first eye of the user and at least one second pixel used for projection to the second eye of the user among a plurality of pixels of the 3D display based on the optimized first eye spatial coordinate and the optimized second eye spatial coordinate.

10. The eye tracking method according to claim 1, wherein the 3D display is a naked eye 3D display.

11. An eye tracking device, comprising:
a plurality of image capturing elements;
a processor, coupled to the image capturing elements and configured to:
obtain a reference interpupillary distance value;
take a plurality of images of a user of a 3D display through the image capturing elements, and find a first eye pixel coordinate corresponding to a first eye of the user and a second eye pixel coordinate corresponding to a second eye of the user in each of the images;
detect a first eye spatial coordinate of the first eye of the user and a second eye spatial coordinate of the second eye of the user, and determine a plurality of projection coordinates based on the first eye spatial coordinate, the second eye spatial coordinate, and a plurality of optical parameters of the image capturing elements;
determine an optimization condition related to the first eye spatial coordinate and the second eye spatial coordinate based on the first eye pixel coordinate, the second eye pixel coordinate, the projection coordinates, and the reference interpupillary distance value of each of the images; and
optimize the first eye spatial coordinate and the second eye spatial coordinate based on the optimization condition.

12. The eye tracking device according to claim 11, wherein the processor executes:
requesting the user to move to a designated position and measuring a current interpupillary distance value of the user to serve as the reference interpupillary distance value.

13. The eye tracking device according to claim 12, wherein a distance between the designated position and the image capturing elements is less than a predetermined distance threshold value.

14. The eye tracking device according to claim 12, wherein the processor further executes:
guiding the user to move to the designated location through sounds or images.

15. The eye tracking device according to claim 11, wherein the processor executes:
measuring a current interpupillary distance value of the user and correcting the current interpupillary distance value based on a plurality of historical interpupillary distance values; and
using the corrected current interpupillary distance value as the reference interpupillary distance value.

16. The eye tracking device according to claim 12, wherein the processor executes:
inputting the historical interpupillary distance values and the current interpupillary distance values into a Kalman filter, so that the current interpupillary distance value is corrected by the Kalman filter.

17. The eye tracking device according to claim 11, wherein a number of the image capturing elements and the images is N, the first eye pixel coordinate and the second eye pixel coordinate on a j-th image of the images are represented as $u_{1j}$ and $u_{2j}$, respectively, the first eye spatial coordinate and the second eye spatial coordinate are represented by $X_1$ and $X_2$, respectively, the optical parameters of a j-th image capturing element of the image capturing elements are represented by $C_j$, and the optimization condition is represented by:

$$\min\left(\sum_{i=1}^{2}\sum_{j=1}^{N}(u_{ij}-f(X_i,C_j))^2+\beta(norm(X_1-X_2)-D1)^2\right)$$

where $norm(X_1-X_2)$ is a distance between $X_1$ and $X_2$, $\beta$ is a weight, D1 is the reference interpupillary distance value, and $f(X_i,C_j)$ is the projection coordinate generated based on $X_i$ and $C_j$.

18. The eye tracking device according to claim 11, wherein the processor executes:
using a gradient descent method to optimize the first eye spatial coordinate and the second eye spatial coordinate based on the optimization condition.

19. The eye tracking device according to claim 11, wherein after optimizing the first eye spatial coordinate and the second eye spatial coordinate based on the optimization condition, the processor further executes:
providing the 3D display with the optimized first eye spatial coordinate and the optimized second eye spatial coordinate, wherein the 3D display determines at least one first pixel used for projection to the first eye of the user and at least one second pixel used for projection to the second eye of the user among a plurality of pixels of the 3D display based on the optimized first eye spatial coordinate and the optimized second eye spatial coordinate.

20. The eye tracking device according to claim 11, wherein the 3D display is a naked eye 3D display.

\* \* \* \* \*